United States Patent [19]
Creffield et al.

[11] Patent Number: 5,611,366
[45] Date of Patent: Mar. 18, 1997

[54] METHOD AND APPARATUS FOR PRODUCING A VAPORIZED FUEL STREAM

[75] Inventors: Geoffrey K. Creffield, Chessington; Ian F. Chapman, Alton; Janice C. Aitken, Kingston; Mark Cole, Banstead, all of England; George R. White, III, North Plainfield; Harbhajan S. Nayar, New Providence, both of N.J.

[73] Assignee: The BOC Group, Inc., New Providence, N.J.

[21] Appl. No.: 492,278

[22] Filed: Jun. 19, 1995

[51] Int. Cl.⁶ .................................................... G05D 7/06
[52] U.S. Cl. .............................. 137/209; 431/2; 431/11
[58] Field of Search ................................ 431/2, 11, 207; 137/209

[56] References Cited

U.S. PATENT DOCUMENTS 3,820,562   6/1974   Roberts et al. .................... 137/209

*Primary Examiner*—Noah P. Kamen
*Attorney, Agent, or Firm*—R. Hain Swope; Salvatore P. Pace

[57] ABSTRACT

Method and apparatus for producing a vaporized fuel stream from a liquid fuel in which an inert gas is injected into a pressurized storage container containing the liquid fuel to provide a vaporized fuel stream having a substantially constant pressure, flow rate and composition.

7 Claims, 2 Drawing Sheets

METHOD AND APPARATUS FOR PRODUCING A VAPORIZED FUEL STREAM

The present invention is directed to apparatus and process for producing a high pressure, high flow rate vaporized fuel stream from a liquid contained within a storage container through the injection of an inert gas into the container. The liquid fuel is transferred to a vaporizer where it is transformed into a vapor suitable for high pressure and high flow rate applications such as high velocity oxyfuel thermal spraying and the like.

BACKGROUND OF THE INVENTION

Pressurized gaseous fuels are supplied to a combustion process in a number of applications such as, for example, high velocity oxyfuel thermal spraying. A typical pressure required for such operations is about 100 psig and flow rates of up to about 200 standard cubic feet per hour (SCFH) per spray gun. The fuels used in such systems include propylene, propane, and methyl acetylene propadiene (MAPP), in combination with oxygen.

The liquid fuels are stored in pressurized containers. When the container is at least substantially filled, the liquid fuel is ejected as a gas under vapor pressures which are sufficient to employ the same in high pressure, high flow rate spraying applications. The temperature of the liquid fuel decreases due to the latent heat of vaporization thereby reducing the pressure within the container. As a result, it is difficult to maintain a constant pressure and constant flow rate of the gas. It is not uncommon under these circumstances for the operation of the storage container to be discontinued until the temperature within the container rises to a level sufficient to provide the necessary vapor pressure for the gas. The most desirable vaporized streams are those that are supplied to the combustion system at a constant pressure, constant flow rate and a constant gas composition.

Maintaining a constant pressure and flow rate presents problems. This is because as the level of the liquid fuel in the storage container decreases, the temperature likewise decreases due to the latent heat of vaporization. A reduction in temperature within the storage container results in a reduction of pressure which adversely affects both the pressure and flow rate of the vaporized fuel stream.

It is not uncommon under these circumstances to discontinue the operation of the storage container until the temperature within the container rises to a level sufficient to provide the necessary vapor pressure for the gas. Such an arrangement, however, is inefficient because the vapor fuel supply is discontinuous. In order to overcome this problem, storage containers are combined in groups with some of the containers (typically one-half) supplying fuel while the other containers are off-line until reaching an operating temperature. Although this system provides for the continuous supply of the fuel gas, it is costly and inefficient.

It has been proposed to maintain the pressure within the storage container by supplying the container with a stream of the vaporized fuel from an external source, such as from the vaporizer used to heat the liquid fuel to form a vaporized stream. However, when the heated vaporized stream is transported to the generally cooler storage container there results a change in the composition of the vaporized stream, if the fuel comprises more than one component (i.e. a mixed fuel). This is due to the different vaporization temperatures of the components of the mixed gas. For example, a liquid fuel containing 94% propane and 6% butane will generate a vaporized stream that will vary in composition with respect to both propane and butane components.

The change in composition of the fuel gas presents problems in the combustion process. Changes in the composition of the fuel gas can result in the presence of uncombusted hydrocarbons leading to the formation of soot within the ejection nozzle. In particular, a change in the vapor composition to one containing a higher fraction of higher hydrocarbons, changes the amount of oxygen needed for complete combustion. This may require more oxygen which adds to the cost or varying rates of oxygen which is difficult to maintain.

The use of liquid fuels stored in customary storage containers therefore suffers from disadvantages which adversely affect both the flow rates and composition of the fuel. As a consequence processes requiring high pressure, high flow rate vaporized fuel streams such as oxyfuel thermal spraying are inefficient and costly.

It would therefore be a significant advance in the art of generating high pressure, high flow rate vaporized fuel streams if a fuel stream could be produced at a substantially constant pressure and flow rate without substantial variation in composition.

SUMMARY OF THE INVENTION

The present invention is generally directed to a process and apparatus for producing a vaporized fuel stream particularly adapted, for example, for high velocity oxyfuel thermal spray applications. In accordance with the present invention a liquid fuel, stored in a pressurized container, is removed from the storage container and vaporized under conditions which produce a flow of the gas at substantially constant pressure, constant flow rate and constant composition. The process is accomplished by the injection of an inert gas into the storage container so that all of the fuel within the container remains pressurized and can easily be withdrawn as a liquid and subsequently vaporized without significant change in composition.

In particular, the process and apparatus for producing a high pressure, high flow rate vaporized fuel supply comprises:

a) injecting an inert gas into a container containing a liquid fuel;

b) removing a stream of liquid fuel from said container; and c) transforming the liquid fuel into a pressurized vapor stream.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

The present invention is directed to a process and apparatus which generate a vaporized fuel stream having a substantially constant pressure, flow rate and gas composition from a liquid fuel storage container by injecting an inert gas into the container. The present invention provides for the efficient use of the liquid fuel stored within the container so that substantially all of the fuel contained therein can be vaporized into a fuel stream suitable for use in high pressure, high flow rate applications.

Figure 1:
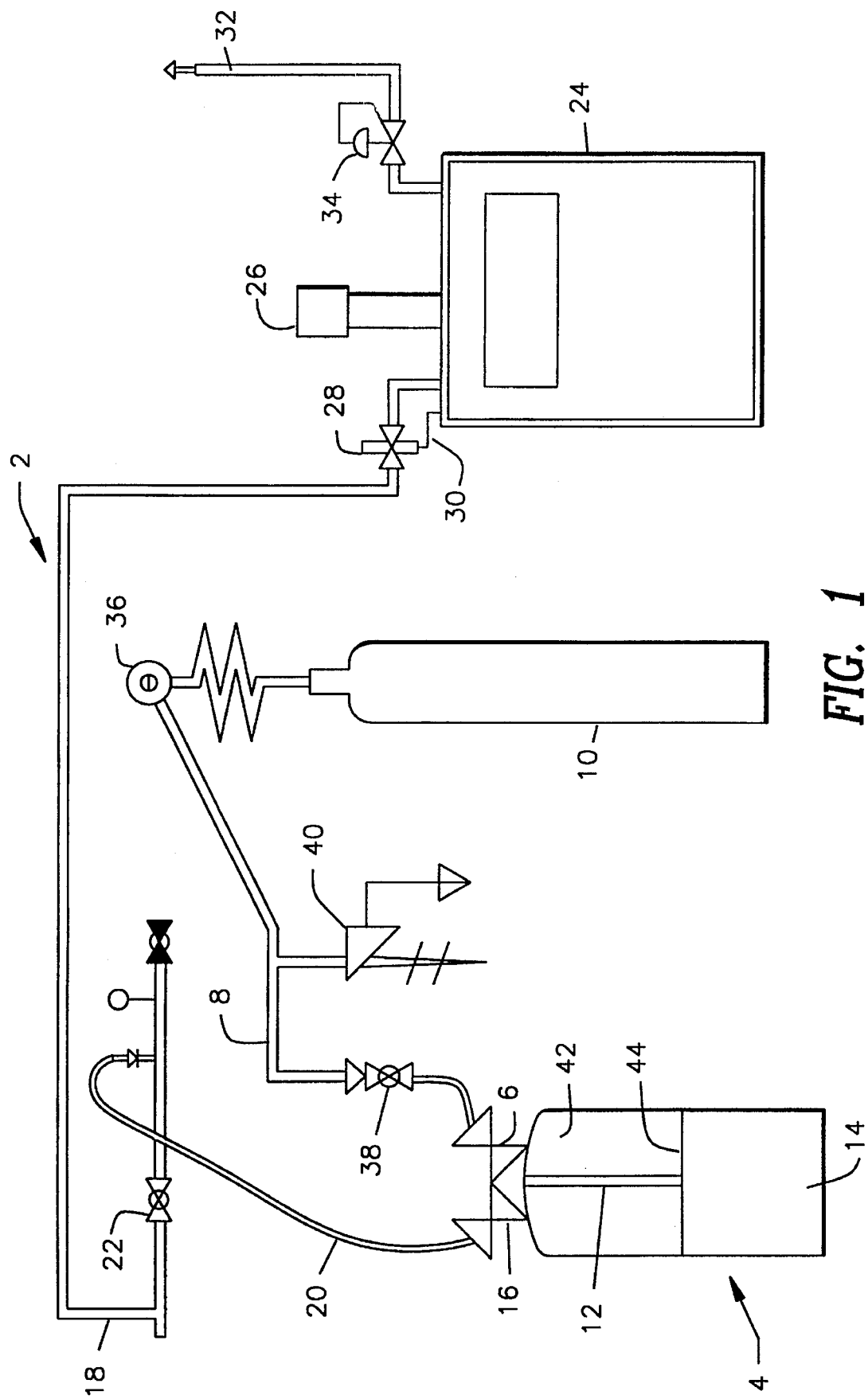
FIG. 1 is an embodiment of the invention employing a single storage container for a liquid fuel.

Referring to FIG. 1 there is shown an embodiment of the invention in which a single storage container is employed as a source of the liquid fuel. More specifically, the system 2 of the present invention includes a fuel storage container 4 having an inlet 6 for receiving an inert gas via a conduit 8 from an inert gas storage container 10.

The fuel storage container 4 contains a tube 12 which extends almost to the floor 14 of the container 4. The tube 12 provides a pathway for the flow of the liquid fuel when pressure is exerted by the incoming inert gas. The fuel storage container includes an outlet 16 through which the liquid fuel passes into a conduit 18 via a flexible delivery tube 20. The flow of the liquid fuel through the conduit 18 is controlled by a safety valve 22.

The conduit 18 is connected to a vaporizer 24 operating at a temperature sufficient to vaporize the liquid fuel. One such example of a suitable vaporizer is a hot water/glycol vaporizer maintained at a temperature sufficient to vaporize each component of the liquid fuel, typically between about 30° and 100° C., by a thermostatically controlled immersion heater 26.

The flow of the liquid fuel from the conduit 18 into the vaporizer 24 is controlled by a temperature sensitive shut-off valve 28 which includes a thermal probe 30 which detects the temperature of the water bath within the vaporizer. The valve 28 is operated to prevent the flow of the liquid fuel into the vaporizer 24 until the water bath has attained a minimum desired temperature sufficient for vaporization of the liquid fuel. The valve 28 therefore prevents flooding of the vaporizer 24 with the liquid fuel before it has reached operating temperature and thus avoids any liquid fuel carryover into the vaporization portion of the system 2.

The vaporizer 24 transforms the liquid fuel into a superheated high pressure, high flow rate vaporized fuel stream having a temperature of typically up to about 50° C. The vaporized fuel stream exits the vaporizer 24 through a conduit 32. A pressure control valve 34 is operatively connected to the conduit 32 to regulate the pressure of the vaporized fuel stream. The conduit 32 may be heated and/or insulated to prevent condensation of the vaporized fuel stream. For example, the conduit may be wrapped in the heating tape for this purpose.

The fuels that may be employed in the present invention are varied and include any fuels that can be stored in liquid form under pressure and then vaporized to create a high pressure and high flow rate. Such fuels include by way of example propane, propylene, MAPP, combinations thereof and the like.

In accordance with the present invention, an inert gas is supplied to the fuel storage container 4 to maintain the liquid fuel under sufficient pressure to ensure a steady flow of the liquid fuel. By maintaining the liquid fuel under pressure in this manner, there is produced a vapor fuel stream having a substantially constant pressure flow rate and gas composition, suitable for use in high pressure, high flow rate applications.

In particular, the inert gas from the storage container 10 is fed to the fuel storage container 4 via the conduit 8. A pressure regulator 36 is provided to ensure that the inert gas is fed into the fuel storage container at a suitable pressure, typically from about 115 to 190 psig, preferably from about 140 to 175 psig.

A safety valve 38 is provided in the conduit 8 to allow the release of the inert gas through a vent 40 when the storage container 4 has been substantially relieved of the liquid fuel.

The inert gas enters the head space 42 of the container 4 thereby exerting a downward force against the surface 44 of the liquid fuel. The fuel is therefore forced upwardly through the tube 12 and out of the outlet 16.

The inert gases that may be employed to pressurize the liquid fuel include, but are not limited to, nitrogen, argon, helium, mixtures thereof and the like. Nitrogen is the preferred inert gas because of its ready available and relatively low cost.

The system of the present invention can operate with multiple liquid fuel storage containers. The number of containers is unlimited and by way of example only, the system will be described below using two storage containers. It will be understood, however, that all storage containers may be utilized at the same time.

Figure 2:
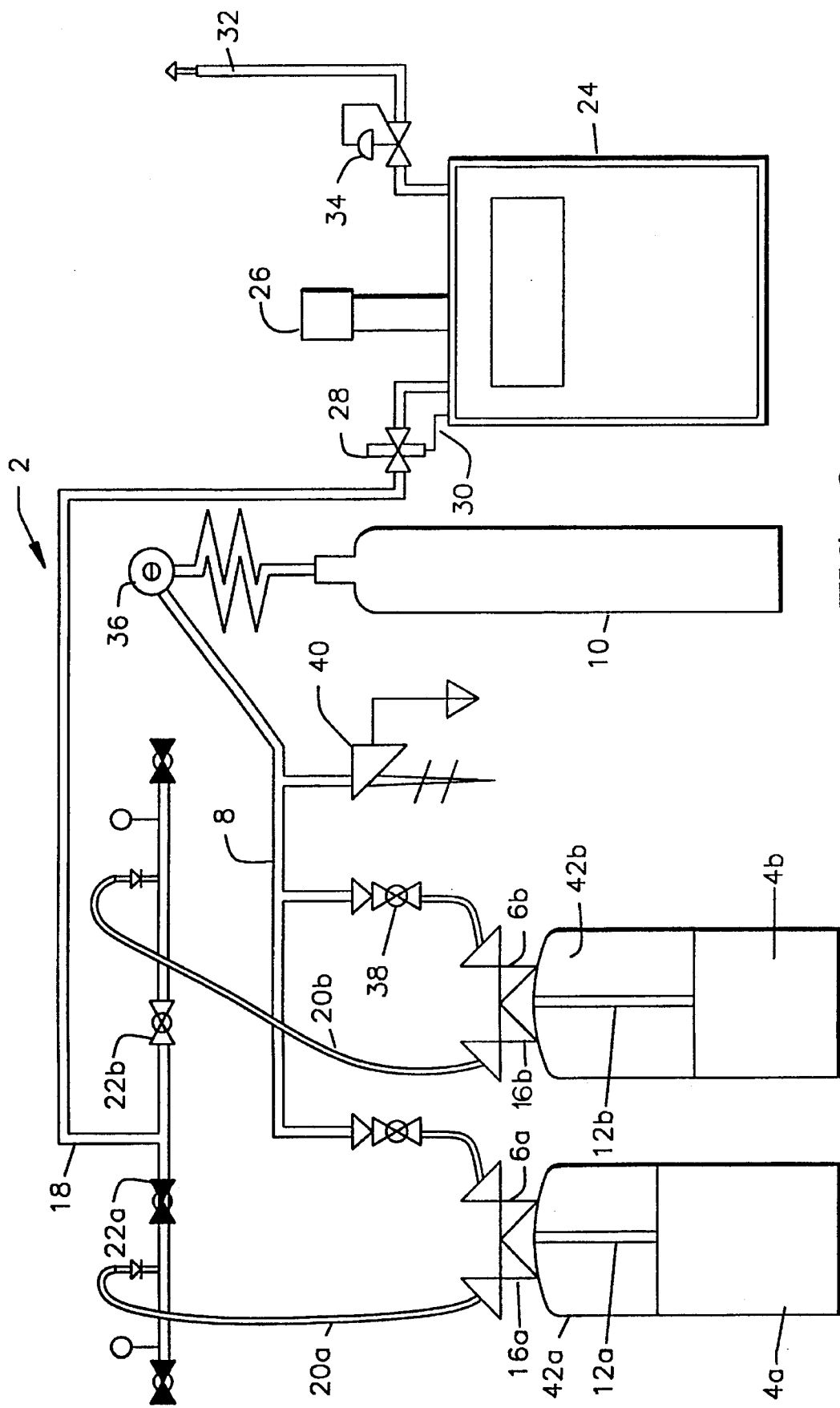
FIG. 2 is another embodiment of the invention employing multiple storage containers for the liquid fuel.

Referring to FIG. 2, the system 2 of the present invention employs two liquid fuel storage containers 4a and 4b, each supplied with an inert gas from an inert gas storage container 10. The pressure of the inert gas is controlled by the pressure regulator 36. As with the embodiment of the invention shown in FIG. 1, the inert gas enters the respective head spaces 42a and 42b and drives the liquid fuel upward through the tubes 12a and 12b and out of the outlets 16a and 16b.

The liquid fuel remains under constant pressure from the pressure exerted by the inert gas as it travels through the tubes 20a and 20b to the conduit 18. The flow of the liquid fuel to the conduit 18 is controlled by the safety valves 22a and 22b. A shut off valve 28 is provided in the conduit 18 to ensure that the liquid fuel flows into the vaporizer 24 only when the temperature of the water bath has attained a predetermined temperature sufficient to vaporize the liquid fuel stream.

EXAMPLE 1

Employing the apparatus shown in FIG. 2, nitrogen at a pressure of 150 psig was used to pressurize the head space above two storage containers containing substantially pure liquid propylene. The pressure of the nitrogen gas forced the liquid propylene up the tube contained with the storage container and out the outlet of the storage containers.

The liquid propylene was transported to a hot water/glycol vaporizer (SPEC No. 1853585 sold by Metcaff & Evans International Ltd.). The water bath was maintained at a temperature from about 60° to 100° C. (preferably 70° C.) by a thermostatically controlled immersion heater, where it was transformed into a superheated vapor. To ensure against recondensation of the vaporized fuel, the conduit connected to the outlet of the vaporizer was preferably heated to a temperature of at least about 50° C. and/or thermally insulated.

The liquid propylene inlet to the vaporizer was controlled by a temperature sensitive shut-off valve that sensed the water bath temperature and prevented the inflow of the liquid propylene when the temperature of the water bath was below a predetermined valve (e.g. 60° C.).

A pressure control valve was provided at the outlet of the vaporizer to regulate the pressure of the vaporized propylene to at least about 100 psig and preferably at least about 120 psig.

The vaporizer temperature must typically be greater than ambient to vaporize the liquid propylene and to prevent condensation of the vaporized propylene. Accordingly, the liquid propylene vaporizer was provided with a relief valve set at about 235 psig which equated to a fuel temperature of about 50° C.

The system was run at a constant supply pressure of 95 psig and a flow rate of about 4.24 m³/h (150 SCFH) over three hours without significant change in pressure, temperature or flow rate.

COMPARATIVE EXAMPLE 2

A conventional storage container was filled with liquid MAPP, The composition of liquid MAPP liquid is shown below in Table 1,

TABLE 1

| component | liquid MAPP | vaporized MAPP container full | vaporized MAPP container empty |
| --- | --- | --- | --- |
| propylene | 40.5% | 50.0%* | 3.0%* |
| propane | 12.4% | 15.0% | 1.0% |
| propadiene | 13.6% | 11.0% | 4.2% |
| methylacetylene | 29.3% | 20.0% | 56.3% |
| butanes | 3.6% | 3.0% | 33.0% |
| other** | 0.6% | 1.0% | 2.5% |

*mole %
**includes methane, ethane, cyclopentane, butadienes and pentanes

The MAPP was withdrawn as a vapor until the storage container was substantially empty. A sample of the MAPP vapor was analyzed when the storage container was substantially full of liquid MAPP and again when the storage container was substantially empty. The results are shown in Table 1.

As shown in Table 1, vaporization of a liquid fuel results in a significant change in composition of the liquid fuel. The degree of change in composition is particularly significant as the level of liquid fuel in the storage container approaches empty.

EXAMPLE 3

Employing the apparatus of FIG. 2, liquid MAPP having the composition shown in Table 1 was vaporized in accordance with the present invention under essentially the same conditions set forth in Example 1, except that the flow rate was 140 SCFH.

A sample of the vaporized MAPP was analyzed when the storage container was substantially full and again when the storage container was substantially empty. In each case, the composition of the MAPP vapor was substantially the same as the composition of the starting MAPP liquid.

EXAMPLE 4

Employing the apparatus of FIG. 2, a liquid comprised of 94 mole % propane and 6 mole % butanes was used as the starting fuel. Nitrogen at a pressure of 135 psig was used to pressurize the head space above the two storage containers.

The liquid fuel was transported to a hot water/glycol vaporizer of the same type employed in Example 1. The water bath was maintained at a temperature of from about 80° to 90° C. by a thermostatically controlled immersion heater, where it was transformed into a superheated vapor. To ensure against recondensation of the vaporized fuel, the conduit connected to the outlet of the vaporizer was preferably heated to a temperature of at least about 50° C. and/or thermally insulated.

The liquid fuel inlet to the vaporizer was controlled by a temperature sensitive shut-off valve that sensed the water bath temperature and prevented the inflow of liquid fuel when the temperature of the water bath was below 80° C.

A pressure control valve was provided at the outlet of the vaporizer to regulate the pressure of the vaporized liquid fuel to at least 80 psi.

The vaporizer temperature must typically be greater than ambient to prevent the liquid fuel from getting through the vaporizer and/or to prevent condensation of the vaporized fuel. Accordingly, the liquid fuel vaporizer was provided with a relief valve set at about 235 psig which equated to a fuel temperature of about 55° C.

The system was run at a constant supply pressure of 80 psig and a flow rate of about 4.2 m³/h (150 SCFH) over three hours without significant change in pressure, temperature or flow rate. The vaporized fuel was sampled in the same manner as described in Example 2. The composition of the vaporized fuel in each case was substantially the same as the composition of the liquid fuel (i.e. 94 mole % propane and 6 mole % butanes).

COMPARATIVE EXAMPLE 5

Employing a conventional apparatus, the liquid fuel employed in Example 4 was vaporized in the absence of inert gas pressurization and the vaporizer until the storage container was substantially empty. A sample of the vaporized fuel was analyzed when the storage container was substantially full and again when the storage container was substantially empty. The results are shown in Table 2.

TABLE 2

| component | liquid fuel | vaporized fuel container full | vaporized fuel container empty |
| --- | --- | --- | --- |
| propane | 94.0%* | 98.0%* | 83.0% |
| butanes | 6.0% | 2.0% | 17.0% |

*mole %

As shown in Table 2, vaporization of the liquid fuel in the absence of inert gas pressurization resulted in a significant change in composition, especially as the storage container approached empty.

What is claimed is:

1. A process for producing a vaporized fuel stream comprising:
   a) injecting an inert gas into a pressurized container containing a liquified gaseous fuel at a pressure sufficient to generate a stream of liquid fuel and at a rate such that the temperature in said container remains generally constant when said fuel is removed;
   b) removing the stream of fuel from said container; and
   c) transforming the fuel stream into a vaporized fuel stream.

2. The process of claim 1 wherein the step of transforming the liquid fuel stream into a vaporized fuel stream comprises passing the liquid fuel stream to a vaporizer and heating the liquid fuel stream within the vaporizer to a temperature sufficient to vaporize the liquid fuel.

3. The process of claim 2 comprising heating the liquid fuel to a temperature of from 30° to 100° C.

4. The process of claim 2 further comprising removing the vaporized fuel from the vaporizer and maintaining the vaporized fuel stream at a temperature above the condensation point of the vaporized fuel stream.

5. The process of claim 1 comprising transforming the liquid fuel stream into a vaporized fuel stream having a substantially constant pressure and flow rate.

6. The process of claim 1 comprising injecting the inert gas into the storage container at a pressure of from 115 to 190 psig.

7. Apparatus for producing a vaporized fuel stream comprising:

a) a pressurized container containing a liquified gaseous fuel;

b) means for removing a stream of said fuel from the container;

c) a source of inert gas;

d) injection means for injecting the inert gas from the source into said container at a pressure sufficient to generate a stream of liquid fuel and at a rate to maintain a generally constant temperature in said container when said fuel is removed; and e) vaporization means connected to said removing means for vaporizing the fuel to produce a vaporized fuel stream.

* * * * *